Jan. 23, 1968 R. J. HOLTON 3,364,807
THREADLESS NUT TYPE FASTENER
Filed Nov. 26, 1965 2 Sheets-Sheet 1

*INVENTOR.*
ROBERT J. HOLTON
BY
*Teare, Teare + Sammon*
ATTORNEYS

Jan. 23, 1968     R. J. HOLTON     3,364,807
THREADLESS NUT TYPE FASTENER
Filed Nov. 26, 1965     2 Sheets-Sheet 2

*INVENTOR.*
ROBERT J. HOLTON
BY
Teare, Teare + Sammon
ATTORNEYS

United States Patent Office 3,364,807
Patented Jan. 23, 1968

3,364,807
THREADLESS NUT TYPE FASTENER
Robert J. Holton, Rocky River, Ohio, assignor to Tinnerman Products, Inc., Cleveland, Ohio, a corporation of Ohio
Filed Nov. 26, 1965, Ser. No. 509,950
21 Claims. (Cl. 85—36)

ABSTRACT OF THE DISCLOSURE

A threadless fastening device for mounting with a threaded member comprising a body having a threadless bore extending therethrough. The bore having an upper portion and a lower portion which has a greater transverse dimension as compared to the corresponding dimension of upper portion, and a deformable pilot means formed from the material of the body and projecting radially into the bore between the upper and lower portions thereof for receiving therethrough a leading end of a threaded member so as to maintain axial alignment of the threaded member upon self-threading movement through the bore.

This invention relates to fastening devices and more particularly to an improved construction for a fastening device of the threadless nut type for assembly with threaded members, such as with screws, studs, bolts and the like.

Heretofore, considerable difficulty has been encountered in the assembly of threaded nut type retainers with threaded members, such as with screws, studs, bolts and the like, particularly in the automotive industry where mass assembly-line procedures are employed for integration of the various components. It has been found that the operators encounter considerable cross-threading in the assembly of threaded mating parts, such as for instance, in the assembly of a 5/16 inch screw having 24 threads per inch with a 5/16 inch nut having 24 threads per inch. Such cross-threading has resulted in failure of the retainer assembly, particularly when employed in the automotive environment wherein driving places severe strain forces on the parts.

One attempt to obviate cross-threading has been to assemble threaded, but non-mating parts, such as by threading a 5/16 inch screw having 18 threads per inch into a 5/16 inch nut having 24 threads per inch. It has been found, however, that such arrangement does not provide the necessary holding power on the parts, particularly under severe load conditions. Other attempts have been made to obviate these problems by driving a threaded member, such as a screw, into an unthreaded nut retainer. It has been found, however, that with such unthreaded nut arrangement no control can be maintained over cross-threading and generally the screw is driven at an angle which results in cocking and misalignment of the screw with consequent loss of holding power on the parts.

Summary of the invention

The present invention relates to a threadless fastening device for use with threaded members, such as screws, studs, bolts and the like. The device comprises a body having a threadless bore extending therethrough. The bore includes an upper portion having a transverse dimension which is less than the maximum transverse dimension of the threaded member and a lower portion which has a greater transverse dimension as compared to the maximum transverse dimension of the threaded member. A deformable pilot means is formed from the material of the body and projects radially into the bore between the upper and lower portions, whereby the leading end of a threaded member is initially picked up by the deformable pilot means to maintain axial alignment of the threaded member upon self-threading movement of the threaded member through the bore in said body.

Accordingly, it is a principal object of the present invention to provide an improved construction for a fastening device of the threadless nut type which effectively overcomes the aforementioned and other related disadvantages of heretofore known types of fastening devices.

A further object of the present invention is to provide a fastening device of the character described which incorporates a novel, structural arrangement which acts as a deformable pilot and/or guide means for picking up the leading end portion of a threaded member. This enables the threaded member to be inserted at an angle, and automatically prevents cocking or misalignment of the threaded member with respect to the device. It also prevents cross-threading of the parts as well as any deformation and/or shearing of the threads.

Another object of the present invention is to provide a fastening device of the character described which snags a ragged leading portion of a threaded member to facilitate the maintenance of axial alignment thereof upon initial insertion into said device.

Another object of the present invention is to provide a fastening device of the character described which provides an additional locking action on the threads of the member without deformation and/or shearing thereof, and which enables substantially greater torque forces to be imparted to the device for holding the parts together.

A still further object of the present invention is to provide a fastening device of the character described which may be employed in combination with various retainers, such as with J-shaped, U-shaped or the like, for assembly with support members, such as with apertured panels or the like, and which enables the threads on the threaded member to be picked up at a very low value, thereby to prevent the retainer from being pulled from the panel.

Other objects and advantages of the invention will be apparent from the following description taken in conjunction with the accompanying drawings wherein.

Referring again to the drawings, and in particular to FIGS. 1 to 4 thereof, there is illustrated in one form of the present invention a fastening device, designated generally at 2, made from a metallic blank which has been formed into the nut-type construction shown. In the embodiment illustrated, the body of the device 2 comprises a head 4 which preferably includes a polygonal, such as hexagonal, outer peripheral side surface 6 for engagement by a suitable tool, such as a wrench or the like, for purposes of installing the device. The head 4 may have a planar top surface 8 which is preferably chamfered, as at 10, to eliminate any sharp edges thereon.

Figure 1:
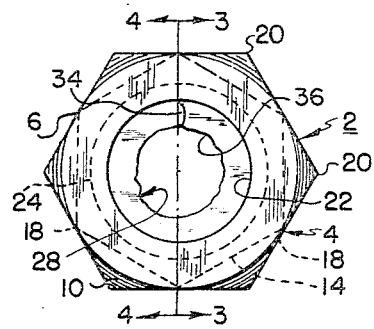
FIG. 1 is a top plan view of the improved fastening device made in accordance with the invention.
Figure 2:
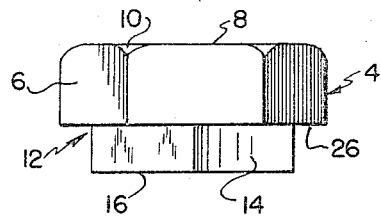
FIG. 2 is a side elevation view of the fastening device shown in FIG. 1.

An integral shank 12 depends downwardly from the head 4 and includes a polygonal, such as hexagonal, outer peripheral side surfaces 14. As shown, the side surfaces 14 of the shank 12 are preferably angularly offset about a vertical axis with respect to the side surfaces 6 of the head 4. Preferably, the head 4 is disposed at an angle of 45° with respect to the shank 12, as best shown in FIG. 1. The shank 12 has a planar bearing surface 16 for abutment against the confronting surface of a support member P, such as the panel shown in FIG. 5.

As best shown in FIG. 1, the maximum transverse dimension of the head 4 may be approximately equal to the maximum transverse dimension of the shank 12. Thus with the aforementioned angular offset orientation of the head 4 with respect to the shank 12, the apices 18 of the sidesurfaces 14 of the shank 12 are disposed intermediate the apices 20 of the side surfaces 6 of the head 4 and lie in the same general vertical plane with one another.

In accordance with the invention, a bore 22 extends axially downwardly through the head 4 from adjacent its top surface 8. As shown, the bore 22 terminates generally at the medial portion of the head 4. The bore 22 has a smooth, plain (threadless) interior surface and preferably has a diameter A which is substantially less than the major diameter M of a threaded member S, such as the screw of FIG. 5, which is adapted for self-threading coacting engagement therein.

Figure 5:
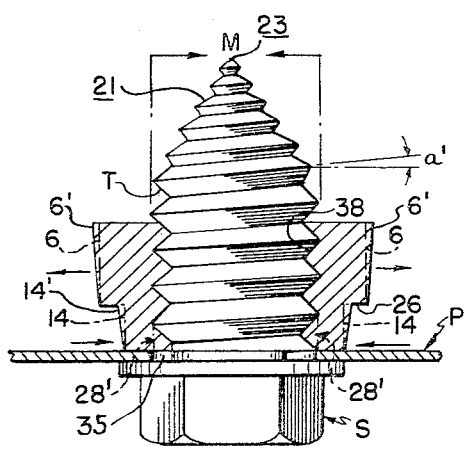
FIG. 5 is a fragmentary section view showing one form of the fastening device of the invention assembled with a threaded member, such as a screw, and mounted on an apertured support member, such as a panel.

For purposes of definition, the term "major diameter" of the threaded member S refers to the largest diameter of the screw thread T, as best shown in FIG. 5.

The threaded member S has generally helical threads T extending longitudinally thereof. A tapered, leading conical portion 21 is provided adjacent the entry end of the threaded member which portion terminates in an irregular or ragged tip 23 adapted to engageably snag a pilot means of the device 2, as will hereinafter be more fully described.

Figure 3:
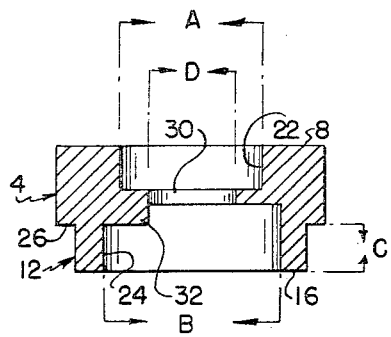
FIG. 3 is a vertical cross-section view taken along the plane indicated by the line 3—3 of FIG. 1.

Another bore 24 extends axially upwardly through the shank 12 and partially into the bore 22 of the head 4. The bore 24 is concentrically disposed with respect to the bore 22 and also has a smooth, plain (threadless) interior surface. In this case, however, the bore 24 preferably has a diameter B which is approximately equal to or slightly greater than the major diameter M of the threaded member S to provide a slight clearance on either side thereof so that the threaded member S may be inserted therein without self-threading engagement therewith. As shown in FIG. 3, the bore 24 may have a depth C which is preferably about one-half as great as the major diameter M of the threaded member S. Moreover, for a threaded member, such as a screw or the like, having a major diameter of 5/16 inch, the bore 24 would have a depth C of about 1/8 inch or a ratio of about 2:1.

Figure 4:
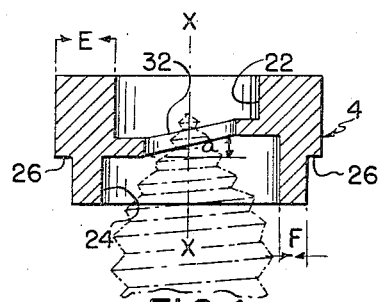
FIG. 4 is a vertical cross-section view taken along the plane indicated by the line 4—4 of FIG. 1, and showing (broken-line) a threaded member about to be inserted into the device.

As best shown in FIGS. 3 and 4, due to the relative difference in diameter between the respective bores 22 and 24, the thickness E (wall thickness) of the head 4 is substantially greater than the thickness F (wall thickness) of the shank 12 to provide a shoulder portion 26 which functions in part as fulcrum area to facilitate radial expansion and contraction of the head 4 and shank 12, respectively. To the accomplishment of this purpose, the wall thickness E of the head 4, in the embodiment shown, is preferably twice as great as the wall thickness F of the shank 12.

Now in accordance with the present invention, a deformable, pilot construction is disposed generally at the juncture between the bore 22 in the head 4 and the bore 24 in the shank 12. In the embodiment shown, this construction comprises a rib, designated generally at 28, which projects radially inwardly from the juncture between the respective bores 22 and 24. The rib 28 includes an upper-half portion 30 (FIG. 3) and an integral lower-half portion 32 (FIG. 4) which upper-half portion 30 may slightly overhang the lower-half portion 32 adjacent the opposed ends thereof, as at 34. The upper-half portion 30 is preferably planar so as to lie in a transverse plane which is perpendicular with respect to the rotational axis X—X of the device; while the lower-half portion 32 is helically disposed so as to lie in a plane which is disposed at an acuate angle $a$ with respect to the rotational axis X—X of the device. Preferably, the angle of helical inclination $a$ of the lower-half portion 32 is approximately 14°. Such angle is preferably the same as and extends in the same direction as the pitch angle $a'$ of the threads T on the threaded member S, as best shown in FIG. 5. Preferably, the peripheral edge surface 36 of the respective upper and lower-half portions 30 and 32 may be of an irregular, such as ragged or roughened, construction, as best shown in FIG. 1. This arrangement facilitates the rib 28 in picking up and providing a pilot for leading the tapered end portion 21 of the threaded member S upon its insertion into the device.

The overhang construction of the upper 30 and lower 32 portions of the rib 28 provides, in effect, a double thickness of material which greatly enhances its strength characteristics in that area. It is to be understood, however, that the rib may also be an endless, uninterrupted construction, as desired. Similarly, its edge surface 36 may be of a smooth, uniform character, as desired.

As best shown in FIG. 3, the maximum transverse dimension D of the opening presented by the rib 28 is preferably substantially less than the diameters A and B of the respective bores 22 and 24 and of the major diameter M of the threaded member S. Preferably, for a threaded member, having a major diameter of 5/16 inch, the maximum transverse dimension D of the opening is approximately 5/32 inch or in the ratio of about 2:1. By this arrangement, the rib 28 provides pilot for the tapered end portion 21 of the screw S, thereby to effectively prevent any cocking or misalignment of the same during installation thereof.

The rib 28 may be made by providing, such as by drilling, the bore 22 so that the same extends through the head 4 and shank 12 of the device. A suitable form tool, such as a broach, having a diameter (outside diameter) which is equal to or greater than the major diameter M of the threaded member S may then be inserted upwardly through the bore in the shank 12 so as to broach the material of the shank upwardly to provide the bore 24. Axial displacement of the material of the shank causes the material to progressively bunch together and move radially outwardly to provide the upper 30 and lower 32 portions of the rib 28. It may be desirable to insert a back-up die or pilot member downwardly through the bore 22 in the head 4 to insure a proper formation of the rib during the broaching operation. It can be seen, therefore, that by a correlation between the outside diameter of the form tool and the extent of axial penetration thereof into the base 24 of the shank 12, the relative size of the impression formed thereby, and hence, the amount of material displaced to provide the rib 28 may be effectively controlled.

For a form tool having an outside diameter of 5/16 inch and with the depth of the bore C being about 1/8 inch, the maximum transverse dimension D of the opening presented by the rib 28 would be about 5/32 inch. Thus the ratio of the depth C of the bore 24 to the transverse dimension D of the opening would be about 1:1. Accordingly, the maximum transverse dimension D of the opening presented by the rib, as well as the depth of the bore 24, may vary dependent upon the size and/or shape of the threaded member so as to provide optimum torque characteristics for a given application of the device, as desired.

In assembly, the fastening device 2 may be disposed in alignment with an aperture 35 in the support member P, as shown in FIG. 5. The threaded member S may then be inserted upwardly through the aperture 35 and into the bore 24 of the shank 12, whereupon, the ragged tip 23 of the leading tapered end portion 21 is picked up or snagged by the deformable rib 28, as shown by broken line in FIG. 4. Thus the leading tapered end portion 21 in conjunction with the ragged tip 23 engageable react with the rib 28 to center the threaded member S as it initially enters the opening presented by the rib, while the wall of the bore 24 acts as a guide for bearing against the first few threads T thereof. Moreover, the threaded member S is automatically centered even though it may be initially inserted at an angle with respect to the rotational axis of the device by a power tool at the commencement of the driving operation.

As the threads T commence to turn past the respective portions 30 and 32, the material of the rib 28 is displaced downwardly and partially into the bore 24 of the shank 12 to provide therein a helical-thread formation, as at 28', which corresponds generally to the helical formation of the threads T provided on the threaded member S. As the threaded member S is turned upwardly through the bore 22 of the head 4, the threads T thereon exert a self-threading coacting engagement with the interior surface thereof, as at 38. Such self-threading engagement causes the material of the head 4 to expand radially outwardly, as shown by the arrows in FIG. 5. It will be seen that prior to such expansion, the side surfaces 6 of the head 4 extend vertically and generally parallel with respect to the rotational axis X—X of the device, while after expansion (broken lines) the side surfaces 6' are tapered convergently in the general direction toward the shank 12, thereby indicating that the greatest expansion of the head 4 takes place in the area adjacent the top surface 8 and progressively diminishes in an axial direction to a value of substantially zero in the area adjacent the shoulder portion 26. Simultaneously with this radial expansion of the head 4 and due to the aforementioned axial displacement of the rib 28 into the bore 24 of the shank 12, the material of the shank 12 is drawn or contracted radially inwardly in the manner of a fulcrum action about the shoulder portion 26 and in the general direction toward the rotational axis of the device, as shown by the arrows in FIG. 5. Similarly, it will be seen that prior to contraction, the side surfaces 14 extend vertically and generally parallel to the rotational axis of the device X—X, whereupon, after contraction (broken lines) the side surfaces 14' are tapered convergently in the general direction toward the bearing surface 16 of the shank 12. By this compound radial expansion of the head 4 and radial contraction of the shank 12, the now displaced helical-thread formation of the rib 28' is forced radially inwardly in the general direction toward the rotational axis X—X of the device so that the material thereof is wedged into tight abutting engagement against the confronting turns of the adjacent threads T of the threaded member S, thereby to provide an additional locking action for holding the parts in assembled relationship.

Figure 6:
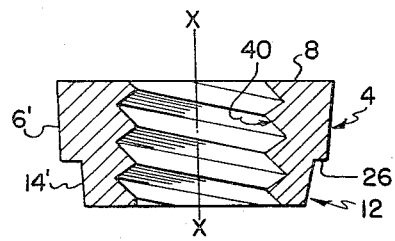
FIG. 6 is a section view of the fastening device after it has been removed from the assembly shown in FIG. 5.

In FIG. 6, the device 2 is shown in cross-section removed from the assembly of FIG. 5, and after it has been bottomed against the support member P. Moreover, it can be seen that after removal of the threaded member S, the head 4 and shank 12, respectively, have been radially expanded and contracted into the configuration shown. Furthermore, it will be seen that uniform, full depth helical threads, as at 40, have been provided to extend substantially the full length of the device 2 for holding the parts in assembled relationship.

Figure 7:
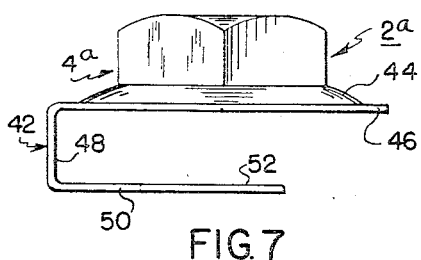
FIG. 7 is a side elevation view showing a modification of the fastening device made in accordance with the invention.
Figure 8:
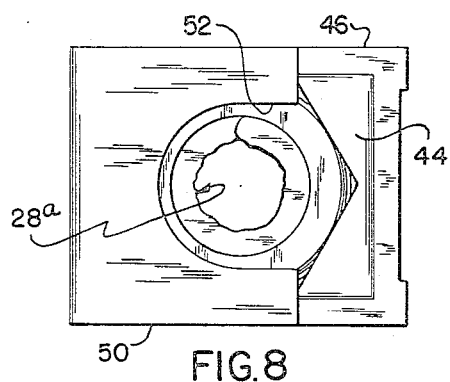
FIG. 8 is a bottom view looking from the underside of the fastening device of FIG. 7.

In FIGS. 7 and 8, there is illustrated a modification of the fastening device, designated generally at 2a, which is generally similar to that shown in FIGS. 1 to 6 with the suffix a added to the reference numerals to designate like parts, except that in this form a generally J-shaped retainer clip, designated generally at 42, is made integral with the head 4a to facilitate attachment thereof to a support member. As shown, the clip 42 comprises a pair of spaced, oppositely disposed parallel legs 46 and 50 which extend from a bight portion 48 which joins the legs together adjacent one end thereof. The leg 50 is preferably foreshortened relative to the leg 46 and includes a cut-out portion 52 which may be of a generally semi-circular configuration for the insertion of a threaded member, such as a screw or the like, therethrough. The head 4a of the device is preferably integrally attached to the leg 46 by means of a raised embossment 44 which may be formed in the material of the leg 46.

In application of this form, the retainer clip 42 is simply inserted over the marginal edge of an apertured support member, such as the panel P shown in FIG. 5, so that the cut-out portion 52 may be disposed in registration with the aperture 35 provided in the support member. Thus positioned, a threaded member, such as the screw S shown in FIG. 5, may then be installed in the manner as heretofore described. By this arrangement, the deformable rib 28a construction acts to pick up the leading tapered end portion of the threaded member S at an appreciably low value to prevent any cocking or misalignment of the threaded member, and to prevent the retainer clip 42 from being "pulled" away from the support member during installation.

Figure 9:
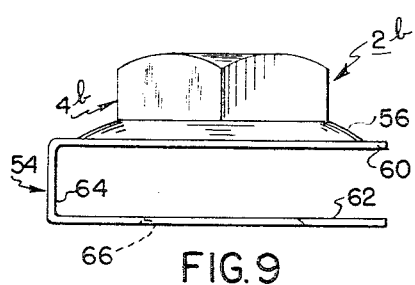
FIG. 9 is a side elevation view of another modification of the fastening device made in accordance with the invention.
Figure 10:
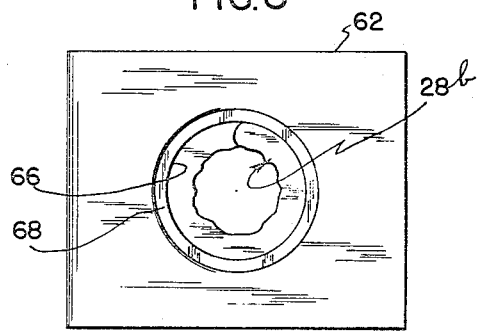
FIG. 10 is a bottom view looking at the underside of the fastening device of FIG. 9.

In FIGS. 9 and 10, there is illustrated another modification of the fastening device 2b which is generally similar to that shown in FIGS. 7 and 8 with the suffix b added to the reference numerals to designate like parts, except that in this form the device includes a generally U-shaped retainer clip 54. As shown, the clip 54 includes a pair of spaced, oppositely disposed parallel legs 60 and 62 which extend from a bight portion 64 which joins the legs together adjacent one end thereof. In this form, the legs 60 and 62 are preferably coextensive in length with the leg 62 having an aperture 66 which is preferably circular in shape adapted to receive a threaded member, such as the screw S of FIG. 5, therethrough. Here again, the other leg 60 may be integrally attached to the head 4b of the device by a raised embossment 56.

Figure 11:
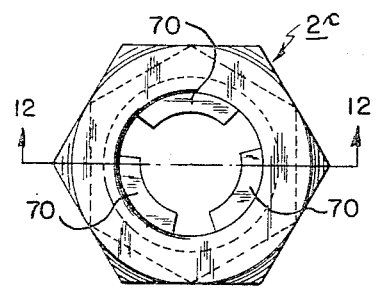
FIG. 11 is a top plan view of another modification of the fastening device made in accordance with the invention.
Figure 12:
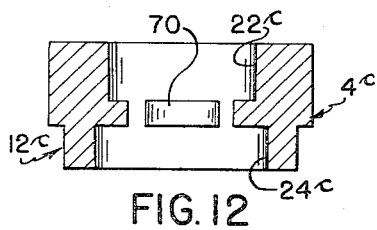
FIG. 12 is a vertical section view taken along the plane indicated by the line 12—12 of FIG. 11.

In FIGS. 11 and 12, there is illustrated another modification of the fastening device 2c which is generally similar to that shown in FIGS. 1 to 6 with the suffix c added to the reference numerals to designate like parts thereof, except that in this form in the place of the deformable rib 28 construction, a plurality of deformable, arcuate lands 70 are provided to project radially inwardly adjacent the juncture between the bore 22c of the head 4c and the bore 24c of the shank 12c. As shown, the arcuate lands 70 are circumferentially spaced and disposed in a common plane which is perpendicular to the rotational axis of the device. The deformable land construction 70 operates in a generally similar manner as the aforementioned deformable rib construction 28 so as to provide a pilot for a threaded member inserted therein, thereby to prevent cocking or misalignment thereof, and to provide a self-threading coacting engagement with the threaded member which additionally locks the component parts in assembled relationship.

Figure 13:
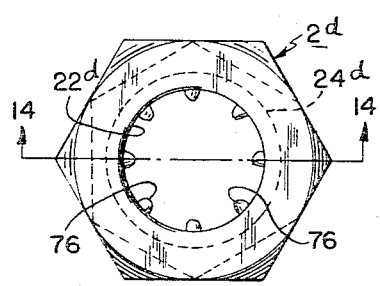
FIG. 13 is a top plan view of still another modification of the fastening device made in accordance with the invention.
Figure 14:
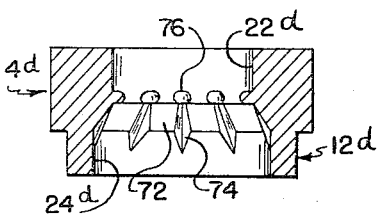
FIG. 14 is a vertical section view taken along the plane indicated by the line 14—14 of FIG. 13.

In FIGS. 13 and 14 there is shown a further modification of the fastening device 2d which is generally similar to that shown in FIGS. 1 to 6 with the suffix d added to the reference numerals to designate like parts, except that in this form in place of the deformable rib construction 28 an annular shoulder 72 is disposed substantially at the juncture between the bore 22d in the head 4d and the bore 24d in the shank 12d. As shown, the shoulder 72 is tapered inwardly with respect to the rotational axis of the device in the direction from the bore 24d toward the bore 22d in the head 4d. In accordance with this further form of the invention, the shoulder 72 is preferably provided with a plurality of circumferentially spaced serrations 74 which may be cut or otherwise formed therein by means of a suitable metal form tool, such as by a broach. In forming the serrations 74, the displaced or removed material resulting therefrom is moved inwardly and upwardly with respect to the shoulder 72 so as to provide a corresponding number of circumferentially spaced projections 76 which extend radially inwardly into the bore 22d toward the rotational axis of the device. Here again, it will be seen that the maximum transverse dimension between respective of the projections 76 is substantially less than the diameter of the respective bores 22d and 24d and of the major diameter of a threaded member, such as the screw S shown in FIG. 5, thereby to effectively pick up the tapered leading turns of threads on the threaded member for the purposes and advantages, as aforesaid.

From the foregoing description and accompanying drawings, it will be seen that the present invention provides an inexpensive, yet efficient fastening device of the threadless nut type which provides a number of important advantages over heretofore known types of fastening devices employed for related purposes. The device, as illustrated in the several modified forms, provides a construction and arrangement which effectively picks up or snags the leading tapered end portion of a threaded member so as to automatically prevent any cocking or misalignment of the threaded member during installation irrespective of any initial starting angle at which the threaded member may be inserted into the device. Such arrangement prevents any deformation or shearing of the threads, particularly at high torque values. It has been found that with the fastening device of the invention, an additional locking action is provided with the threaded member wherein substantially increased torque values are achieved without deformation and/or shearing of the threads. In addition, various retainers, such as the J-shaped and U-shaped clips illustrated, may be readily employed in combination with the device of the invention and are thereby prevented from being pulled away from the support member upon installation of a threaded member for holding the parts in assembled relationship.

While particular embodiments of this invention have been described and shown above, it will be understood that the invention is not to be limited thereto, since many modifications may be made of the fastening device in accordance with the present invention. It is contemplated, therefore, by the appended claims, to cover any such modifications as may fall within the true spirit and scope of this invention.

I claim:

1. A threadless fastening device for mounting on a threaded member comprising, a body having a threadless bore extending axially therethrough, a deformable, circumferentially continuous rib member of substantially uniform thickness formed from the material of said body and projecting radially into said bore and defining an opening for receiving therethrough the leading end of a threaded member to maintain axial alignment thereof upon self-threading movement of the threaded member through said bore, said bore having a first portion of one transverse dimension and a second portion having a greater transverse dimension as compared to the dimension of said first portion, said rib member being disposed intermediate said first and second portions and including a generally planar portion and a generally helical portion, and said helical portion being disposed at substantially the same angle as the thread of said threaded member.

2. A threadless fastening device in accordance with claim 1, wherein the opening presented by said deformable pilot means has a transverse dimension which is substantially less than the transverse dimension of said threaded member.

3. A threadless fastening device in accordance with claim 1, wherein both portions of said bore each have a transverse dimension which is greater than the transverse dimension of the opening presented by said deformable pilot means.

4. A threadless fastening device in accordance with claim 1, including a retainer means attached to the body of said device adapted for securement to the marginal edge of a support member.

5. A threadless fastening device in accordance with claim 1, wherein said first portion comprises an upper portion of the bore which has a transverse dimension which is less than the maximum transverse dimension of the threaded member and wherein the second portion comprises a lower portion of the bore which has a greater transverse dimension than the maximum transverse dimension of the threaded member, and the opening formed by said rib member having a maximum transverse dimension which is less than that of the upper and lower portions of said bore.

6. A threadless fastening device in accordance with claim 1, wherein the said first and second portions of said bore are each defined by an endless side wall, and the thickness of said side wall of said first portion being substantially greater than the thickness of the side wall of said second portion.

7. A threadless fastening device in accordance with claim 1, wherein adjacent edges of the planar and helical portions of said rib member are disposed in overlapping relationship with respect to one another to provide a thickness approximately twice the thickness of either the planar or helical portions thereof.

8. A threadless fastening device in accordance with claim 1, wherein said rib member includes a ragged, irregularly shaped outer marginal edge surface for snagging the leading end of a threaded member.

9. A threadless fastening device in accordance with claim 1, wherein said bore is substantially circular in transverse cross-section, said first portion having a diameter which is less than the transverse dimension of said threaded member, and said second portion having a diameter which is greater than the transverse dimension of said threaded member.

10. A threadless fastening device in accordance with claim 9, wherein the first portion of said bore is concentrically disposed with respect to the second portion of said bore.

11. A threadless fastening device in accordance with claim 1, wherein said body includes a head and a shank depending from said head, said bore extending axially through said head and said shank, the first portion of said bore being disposed in said head and the second portion of said bore being disposed in said shank, and said rib member being disposed substantially adjacent the juncture between said head and said shank.

12. A threadless fastening device in accordance with claim 11, wherein the wall thickness of said head is substantially greater than the wall thickness of said shank.

13. A threadless fastening device in accordance with claim 11, wherein the axial length of the bore portion in said shank is approximately equal to the maximum transverse dimension of the opening formed by said rib member.

14. A threadless fastening device for mounting on a threaded member comprising, a body having a threadless bore extending axially therethrough, a deformable rib means formed from the material of said body and projecting radially into said bore and defining an opening for receiving the leading end of a threaded member to maintain axial alignment of the threaded member upon self-threading movement through said bore, said bore having a first portion having one transverse dimension and a second portion of greater transverse dimension, said rib means comprising a plurality of circumferentially spaced generally arcuate lands, said lands being generally planar and having a uniform thickness disposed substantially in the same transverse plane intermediate the first and second portions of said bore, said transverse plane being substantially perpendicular to the rotational axis of said device, and the opening formed by said lands having a transverse dimension which is less than the transverse dimension of the first and second portions of said bore.

15. A threadless fastening device in accordance with claim 14, wherein said body includes a head and a shank depending from said head, the first portion of said bore being disposed in said head and the second portion of said bore being disposed in said shank, the maximum transverse dimension of the bore in said head being less than the maximum transverse dimension of said threaded member and the maximum transverse dimension of the bore in said shank being greater than the maximum transverse dimension of said threaded member.

16. A threadless fastening device in accordance with claim 15, wherein the bore portions in said head and said shank are cylindrical and are disposed in concentric axial alignment with one another, and the wall thickness of said head being substantially greater than the wall thickness of said shank.

17. A threadless fastening device in accordance with claim 16, wherein the axial length of the bore in said shank is approximately equal to the maximum transverse dimension of the opening defined by said lands.

18. A threadless fastening device for mounting on a threaded member comprising, a body having a threadless bore extending axially therethrough, said bore having a first portion of one transverse dimension and a second portion of a different transverse dimension, a shoulder member disposed intermediate said first and second bore portions, said shoulder member including a plurality of spaced serrations, said serrations terminating in projections extending radially into said bore and defining an opening for receiving the leading end of a threaded member to maintain axial alignment upon self-threading movement of said threaded member through said bore, said projections disposed substantially adjacent the juncture of said shoulder member with said first bore portion, and said first and second bore portions both having a transverse dimension greater than the transverse dimension of the opening presented by said projections.

19. A threadless fastening device in accordance with claim 18, wherein said body includes a head and a shank depending from said head, the first portion of said bore being disposed in said head and the second portion of said bore being disposed in said shank, said shoulder member being disposed substantially adjacent the juncture between said head and said shank, and said shoulder member tapering divergently outwardly in a direction away from said head and toward said shank.

20. A threadless fastening device in accordance with claim 19, wherein the bore in said head and said shank are cylindrical, the diameter of the bore in said head being less than the maximum transverse dimension of threaded member, and the diameter of the bore in said shank being greater than the maximum transverse dimension of said threaded member.

21. A threadless fastening device in accordance with claim 20, wherein the bores in said head and shank are disposed in concentric axial alignment with one another, and the wall thickness of said head being substantially greater than the wall thickness of said shank.

References Cited
UNITED STATES PATENTS

| | | | |
|---|---|---|---|
| 2,167,558 | 7/1939 | Upson | 85—46 |
| 2,551,834 | 5/1951 | Ferguson | 151—7 |
| 2,908,309 | 10/1959 | Brill | 85—36 |
| 3,255,795 | 6/1966 | Ginsburg | 151—7 |
| 3,283,794 | 11/1966 | Steward et al. | 151—41.75 |

MARION PARSONS, JR., *Primary Examiner.*